United States Patent [19]

Hubbins et al.

[11] Patent Number: 4,698,753

[45] Date of Patent: Oct. 6, 1987

[54] MULTIPROCESSOR INTERFACE DEVICE

[75] Inventors: Stephen J. Hubbins, Kempston; David G. England, Wellingborough; Andre Szczepanek, Bedford; David Norvall, Swindon, all of England

[73] Assignee: Texas Instruments Incorporated, Dallas, Tex.

[21] Appl. No.: 440,380

[22] Filed: Nov. 9, 1982

[51] Int. Cl.$^4$ ............................................. G06F 15/16
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,041,460 | 8/1977 | Wisdom et al. | 364/200 |
| 4,065,809 | 12/1977 | Matsumoto | 364/200 |
| 4,164,787 | 8/1979 | Aranguren | 364/200 |
| 4,212,057 | 7/1980 | Devlin et al. | 364/200 |
| 4,308,580 | 12/1981 | Ohtaki | 364/200 |
| 4,415,972 | 11/1983 | Adcock | 364/200 |
| 4,422,142 | 12/1983 | Inaba et al. | 364/200 |
| 4,443,846 | 4/1984 | Adcock | 364/200 |
| 4,453,214 | 1/1984 | Adcock | 364/200 |

*Primary Examiner*—Gareth D. Shaw
*Assistant Examiner*—Kevin A. Kriess

*Attorney, Agent, or Firm*—Robert D. Marshall, Jr.; Rodney M. Anderson

[57] ABSTRACT

A single chip multiprocessor interface device for interfacing between two processors by connection to their bus systems, the device having a random access memory selectively accessible by the processors under the control of an arbitration latch. The arbitration latch has a bistable device the state of which determines which processor has access to the memory. The outputs of the bistable device have threshold devices which have threshold levels higher than the signal outputs of the bistable device when it is in a metastable state, so that there is no possibility that both processors could have access to the memory at the same time. Data and address registers for the two processors are selectively connectible to the random access memory through multiplexers controlled by the arbitration latch. Mode control inputs can set the device into a "stand alone" mode, a "master" mode and a "slave" mode; several devices can be used in parallel for bus systems more than one byte wide with one device the master and the others slaves. Control and status registers for each processor input enable the generation of interrupts when certain conditions are met.

13 Claims, 19 Drawing Figures

| REGISTER SELECT LINES $S_0S_1S_2$ | REGISTER FUNCTION | REGISTER SELECTED | | READ/WRITE |
|---|---|---|---|---|
| | | PORT A | PORT B | |
| 000 | DATA/INC | DATA A | DATA B | R/W |
| 001 | DATA | DATA A | DATA B | R/W |
| 010 | MESSAGE IN | MESS B | MESS A | R |
| 011 | MESSAGE OUT | MESS A | MESS B | R/W |
| 100 | CONTROL | CNTL A | CNTL B | R/W |
| 101 | LOCAL ADDRESS POINTER | ADDR A | ADDR B | R/W |
| 110 | STATUS | STAT A | STAT B | R |
| 111 | REMOTE ADDRESS POINTER | ADDR B | ADDR A | R/W |

```
INT   - INTERRUPT REQUEST ACTIVE
MI    - "MESSAGE IN" RECEIVED
MO    - "MESSAGE OUT" SENT
LPE   - LOCAL POINTER EQUAL
RPE   - REMOTE POINTER EQUAL
LAK   - LOCKIN REQUEST ACKNOWLEDGE
LEA   - LOCKOUT ON EQUAL ADDRESS POINTERS
SLOC  - SOFTWARE LOCKIN REQUEST
```

MULTIPROCESSOR INTERFACE DEVICE

BACKGROUND OF THE INVENTION

This invention relates to a device which can be used as the interface between two separate processors in a multiprocessor system.

In a conventional multiprocessor system, two data processors communicate with each other through a common memory to which they share access. At any given time only one of them can be granted access to this memory which is granted on a first-come, first-served basis. If both processors request access to the memory at the same time only one is granted access immediately and the other must wait until the first processor has completed its access before it can proceed. The decision to grant access to one processor or the other is made by logic embedded in the individual interfaces between the processors and the common memory. When both processors contend for access, the processor which loses the arbitration receives a 'not ready' signal from its interface and it must then wait until the 'not ready' signal is removed and access is granted. The 'not ready' signal typically must be synchronised to the processors' clock to ensure that the specified setting up and hold times are met.

Such a multiprocessor system is becoming of greater importance because a system using several microprocessors can provide enough processing power to compete with a single more powerful and expensive central processing unit. The drawback of the conventional system described above lies in the requirement for numerous device packages to be provided and connected in circuit to accomplish the bus interfacing as described. In addition, if either processor has a private memory connected to its local bus the interface must also include tristate buffers to isolate the local bus from the multiprocessor system bus to prevent accesses to the private memory from interfering with any activity on the multiprocessor bus intiated by the other processor. When timing control circuitry has been added, the hardware requirements for such bus interfaces becomes substantial despite the use of LSI integrated circuits.

The interfaces would be simplified if the common memory were provided as a dual-port RAM, but in such a case a common memory of, say, 256 bytes would occupy 256 address locations in the I/O or memory address space of both processors.

SUMMARY OF THE INVENTION

It is an object of the present invention to provide a device which simplifies the interfacing of one processor to another.

Another object of the invention is to provide a multiprocessor interface device which occupies only a few address locations, although it provides many addresses in a common random access memory.

Another object of the invention is to provide a multiprocessor interface which can operate as a FIFO buffer for the transfer of a large amount of data from one processor system to another.

According to one aspect of the present invention there is provided an interface device implemented on a single semiconductor substrate and comprising a random access memory, a first port for connection of the memory to a first processor, a second port for connection of the memory to a second processor, and an arbitration latch for selectively disabling the connection of one of the first and second ports to the memory.

According to another aspect of the present invention there is provided a multiprocessor interface device comprising a multi-address random access memory, first interface means capable of providing a first processor system with access to the memory, second interface means capable of providing a second processor system with access to the memory, means responsive to requests for access to the memory from the first and second processor systems to record an indication of which processor system made the earliest unsatisfied request, and couplings from the responsive means to the first and second interface means to block access to the memory of that interface means which does not have the earliest unsatisfied request.

The device may include multiplex means for connecting address and read/write circuits of the random access memory to either the first or the second interface means under the control of the responsive means. The device may also include two address registers and two data registers respectively connected to the first and second interface means, which registers are connected to the multiplex means. The address registers may be counters so that the addresses stored may be progressively incremented.

The device may further include status and control registers for each interface means for storing status, control and interrupt data for the device in single bits.

In addition message registers may be provided for each interface means for enabling messages to be passed between the interface means.

The device may have mode setting inputs enabling it to operate as a stand alone device, as a master device to another, slave, device, or as a slave device to another, master, device.

The device may be constructed as an integrated circuit using N-channel silicon gate MOS technology, and it may be arranged to operate from a single 5 volt supply. The random access memory may use conventional 6 transistor static storage elements and it may have a capacity of 256 bytes.

BRIEF DESCRIPTION OF THE DRAWINGS

In order that the invention may be fully understood and readily carried into effect an embodiment of it will now be described with reference to the accompanying drawings, of which.

DESCRIPTION OF THE PREFERRED EMBODIMENT

Figure 1:
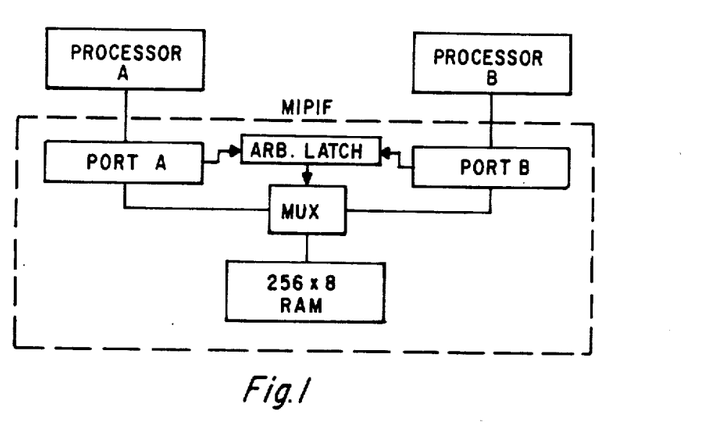
FIG. 1 shows a block diagram of a multiprocessor interface device (MPIF) connected to two processors.

A simplified block diagram of the device is shown in FIG. 1. The device has ports A and B connected respectively to the bus systems of processors A and B and the ports are connected through a multiplexer MUX to a common memory consisting of 256 bytes of RAM.

The device of FIG. 1 is similar in function to a dual-port RAM, but there are important differences as well. A true dual-port RAM provides direct, random access to any of its locations, so that a 256-byte dual-port RAM therefore occupies 256 locations in the I/0- or memory-address space of the processor at each port.

The device of FIG. 1, on the other hand, is arranged to occupy only eight register locations in the address space of each processor. These registers provide status, control and message-passing capabilities, and also manage accesses of the 256-byte RAM. The RAM is accessed indirectly using two pointer registers, one for each port. To access a designated buffer area in the RAM through one of the two ports, the local processor initializes the port's pointer by explicitly loading the pointer with the starting address of the buffer; thereafter, the device uses pointer-autoincrement to step through successive locations in the buffer. This arrangement permits buffer management functions to be performed in hardware by the device with little software overhead.

The switching of the multiplexer MUX in FIG. 1 to one port or the other is performed on a first-come first-served basis in response to access requests from the two ports. This operation is centralized in an arbitration latch ARB.LATCH.

Figure 2:
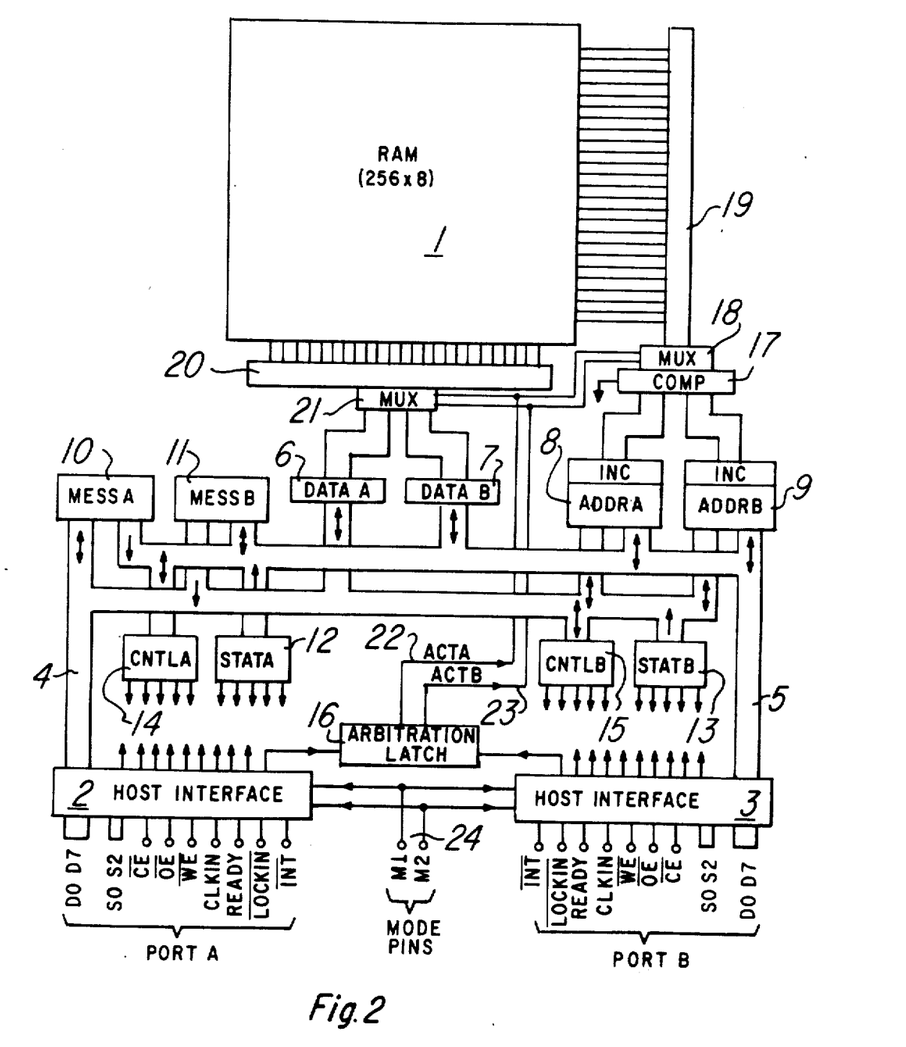
FIG. 2 is a detailed block diagram of the device (MPIF) shown in FIG. 1.

As may be seen from the block diagram shown in FIG. 2, the example of the device according to the invention is built around a 256×8 bit static random access memory 1 and includes two complete host interfaces 2 and 3 and two complete data paths 4 and 5. Each data path connects the host interface to the appropriate on-chip registers under the control of external interface control signals, register select lines and the arbitration latch. The interfaces respectively have access to the RAM 1 via data registers 6 and 7 which are simple bi-directional buffers between the RAM 1 and the data paths 4 and 5.

Each data register 6,7 has associated with it an address pointer register 8,9 which supplies the address to the RAM when the corresponding data register is used. The address registers can be read and written from both host interfaces.

Two message registers 10 and 11 are provided, one assigned to each port and two status registers 12 and 13. The interfaces may read and write their own message register but only read that of the other interface. In addition, there are two control registers 14 and 15. The control registers provide for the configuration and control of the device. It includes the enable bits for the various sources of interrupt request on chip. The status registers show the condition of the various interrupt sources.

The RAM 1 can only be used by one host, via its data register 6 or 7, at one time. Access to the RAM 1 is controlled by which of the two outputs of the arbitration latch 16 exceed a threshold to appear on line 22 or 23.

These select the RAM data and address busses from either the data A and ADDR A register 8 or the data B register 7 and ADDR B register 9 respectively. ACTA becomes true when the data register 6 of port A is addressed, but only if ACTB is not already true and port B has not asserted a lockout. A corresponding definition applies for ACTB. Hence the two signals are mutually exclusive which ensures that both interfaces cannot use the RAM 1 at once. The device permits its hosts continuous access to all the other registers.

The address registers 8 and 9, which can increment their contents if required to do so, are connected to a comparator 17 and via a multiplexer 18 to an address decoder 19 for the RAM 1. Output circuits 20 of the RAM 1 are connected through a multiplexer 21 to the data registers 6 and 7. The multiplexers 18 and 21 are controlled by the signals ACTA and ACTB from the latch 16.

If both interfaces try to gain access to the RAM 1 concurrently then the first to address its data register will exclude the other. Hence the RAM is assigned on a first-come first-served basis unless there are lockouts in operation as described below.

Occasionally both ports may address their data registers at exactly the same time. This may put the arbitration latch into an indeterminate state for a short time. Due to the cross-coupled nature of the latch which is described later with reference to FIG. 7, the indeterminate state will be unstable and eventually the conflict will resolve itself, the outcome being essentially random. The output signals of the latch ACTA and ACTB are passed through threshold circuits to ensure that the unstable state is interpreted as an inactive state for both ports.

Each interface may request exclusive use of the RAM using the lockout feature. This is asserted by means of a software accessible bit or with a dedicated input pin. In situations where both ports assert a lockout, it is assigned on a first-come, first-served basis in a similar manner to the arbitration latch.

A memory cycle of the RAM 1 cannot be allowed to proceed if the port concerned does not succeed in getting access to the RAM or there is uncertainty in the arbitration latch. This may be achieved in three ways:

(i) Ensure in software that both host ports do not try to use the RAM at the same time. Thus any attempt to gain access to the RAM is guaranteed to be successful. This involves the two systems passing messages between themselves regarding their status and intentions, for which the message registers 10 and 11 may be used.

(ii) Use the 'ready' signal provided by the interfaces 2 and 3 to put the system into a wait state if it is not successful in gaining access to the RAM or if uncertainty exists in the arbitration latch. Using this method the RAM appears to software to be dual port.

(iii) By using the software accessible lockout bit to request exclusive use of the RAM and the waiting until this is acknowledged before access to the RAM is attempted.

It is possible to use method (ii) on one port and (iii) on the other if desired.

Figures 3, 4A:
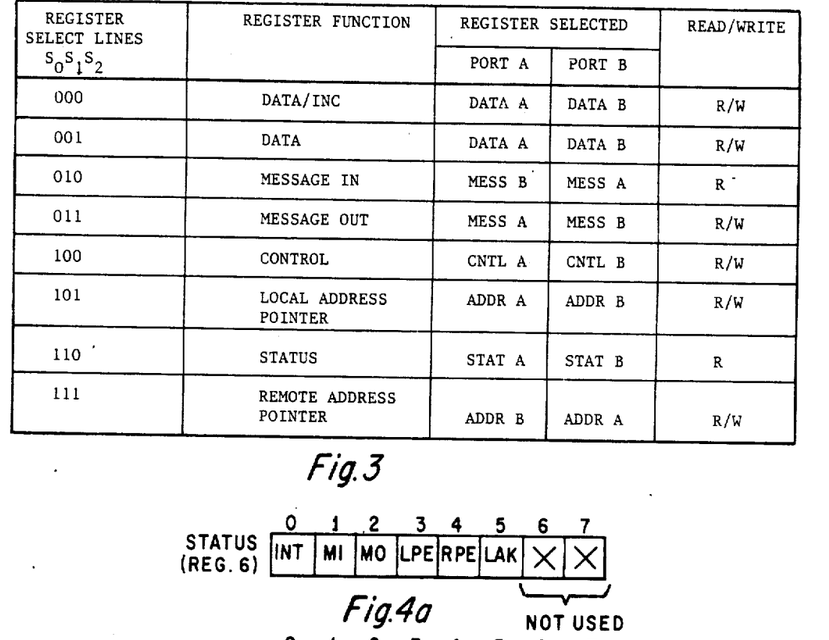
FIG. 3 is a table of the registers in the device and their selection codes.
FIG. 4(a) shows the functions allocated to the bits of the status register.

The device occupies eight locations in the memory map of each host system. It is arranged that the registers accessible at the same location of both ports serve the same function. The ports of the device are therefore completely identical and may be reversed without software or hardware changes. For the purpose of naming the locations in the memory map, the port under consideration is referred to as the 'local' port and the other is referred to as the 'remote' port. The register at each location, its selection code (S0,S1,S2) and its function are shown in FIG. 3.

Each port may read and write its own data register 6 or 7 at the two memory locations designated 'DATA' and 'DATA/INC'. If a memory operation is performed to the RAM via the 'DATA/INC' location the corresponding address pointer register will be incremented on completion of the memory cycle. This incrementing will not occur if the 'DATA' location is used.

Each port may read and write its own address pointer register 8 or 9 at the location designated 'LOCAL ADDRESS POINTER' and may read and write the other ports pointer at the 'REMOTE ADDRESS POINTER' location. This enables each port to determine wherein the RAM it will operate by setting up its own address pointer register. Alternatively the management of the RAM may be under the control of one port only which sets up both address pointers. Each pointer register will cycle through the value HEX 'FF', that is, HEX 'FF' increments to HEX 'OO'. The following limitations apply to the use of these locations:

(i) If either address pointer is read whilst its value is being changed by a write operation from the other port then an erroneous value may be read.

(ii) A port should not write to its remote address pointer location while there is a possibility that the other port could perform a memory operation to the RAM.

This may result in the address pointer being changed during a memory operation and data in the RAM may be corrupted.

Each port may read and write its own message register 10 or 11 at the location designated 'MESSAGE OUT'. In addition it may only read that of the other port at the 'MESSAGE IN' location. The message registers 10 and 11 are implemented as two 8-bit registers which may be written into at any time from the corresponding interface.

Although each host processor may write into or read from the control register at any time, each status register may be read only to allow its corresponding host to inspect the status of various parameters on-chip. All may cause an interrupt if the appropriate interrupt enable bit is set to a '1'. The bit assignment is shown in FIG. 4(a) and the bits have the following significances.

INT . . . INTERRUPT ASSERTED: This indicates that an interrupt status bit has been set and the 'INT(-BAR)' line is pulled low.

MI . . . MESSAGE IN INTERRUPT: This indicates that a byte should be read from the message in register. It is set when the remote port loads its message out register and is cleared when the local port reads its message in register. It is cleared by the 'RESET' function.

MO . . . MESSAGE OUT INTERRUPT: This indicates that the local message register is available for use. It is cleared when a byte is written to the local message out register and set when the remote message in register is read. It is set by the 'RESET' function.

LPE . . . THE LOCAL POINTER HAS BECOME EQUAL TO THE REMOTE POINTER: This is true when the address pointer registers are equal and the local pointer was the last one to change, whether by incrementing or by loading from either port. It remains true as long as the above condition persists.

RPE . . . REMOTE POINTER HAS BECOME EQUAL TO THE LOCAL POINTER: This is true when the address pointer registers are equal and the remote address pointer was the last one to change, whether by incrementing or loading from either port. It remains true as long as the above condition persists.

LAK . . . LOCKOUT ACKNOWLEDGE: This is set following the assertion of 'SLOC' by the local port when the lockout of the remote port from the RAM becomes effective. It is cleared when 'SLOC' is cleared.

Figure 4B:
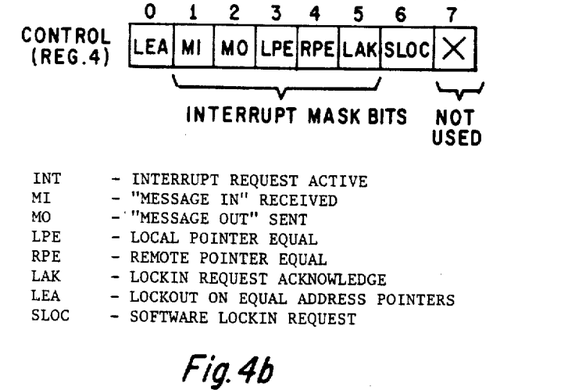
FIG. 4(b) shows the functions allocated to the bits of the control register.
Figures 5, 8:
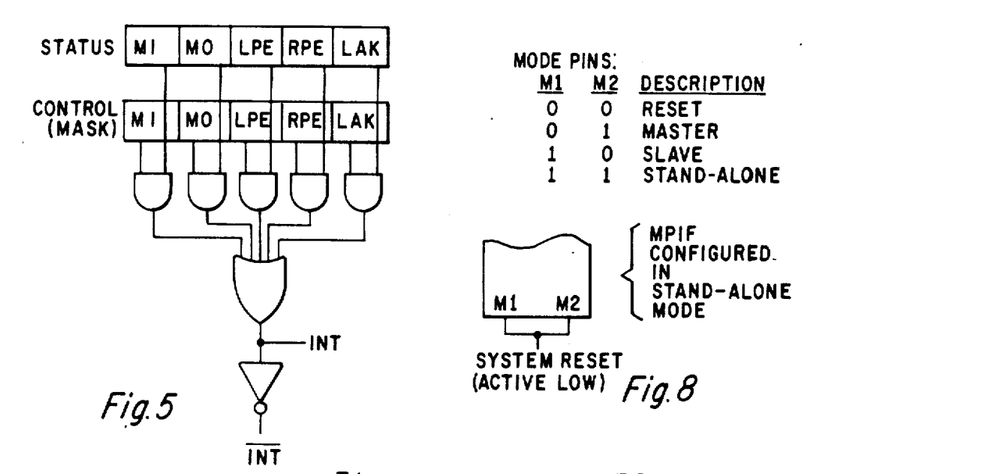
FIG. 5 shows the logic for generating interrupt signals from the bits of the status and control registers.
FIG. 8 illustrates the operation modes available using the signals M1 and M2 on the mode pins.

The bit assignment for the control registers is similar to that for the status registers and is as shown in FIG. 4(b). The bits have the following significances:

INTERRUPT MASK BITS . . . When set to '1' these allow their respective interrupt status bits to set the 'INT' bit and pull low the 'INT(BAR)' line. FIG. 5 shows the logic involved.

LEA . . . LOCKOUT ON EQUAL ADDRESSES POINTER: If this feature is set from either port then it is active for the entire device. When this feature is enabled and the address pointer registers become equal, the port corresponding to the last address pointer register to change will be locked out of the RAM. This will occur irrespective of whether the change was due to incrementing or loading from either port. The lockout will persist as long as the above condition remains true.

SLOC . . . SOFTWARE LOCKOUT BIT: This provides accessible means of requesting that the remote port is locked out of the RAM.

All bits of the control register are cleared by the reset function of the mode pins: 'M1' 'M2' (see below).

The functions and operation of the host interfaces 2 and 3 can be understood from the following descriptions of specific operations and the effects of certain control signals.

Figure 14:
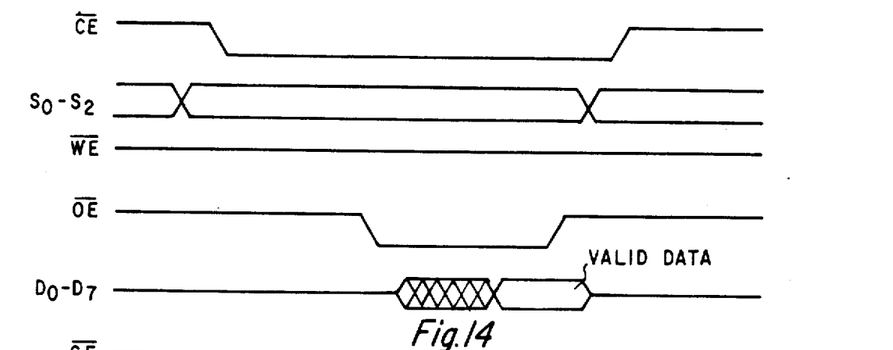
FIG. 14 shows the waveforms for a read operation of the memory in the device.
Figure 15:
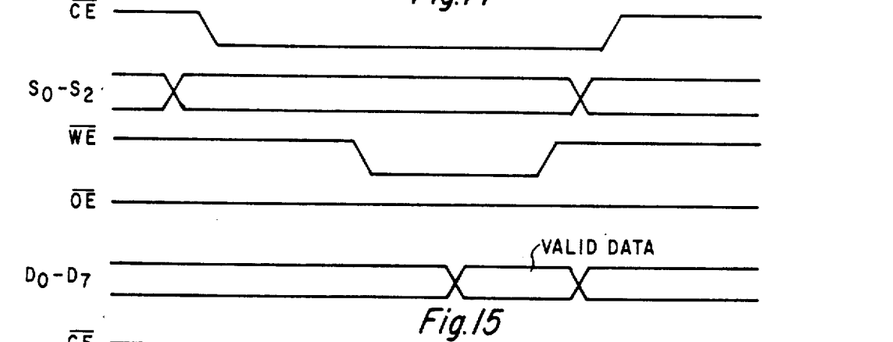
FIG. 15 shows the waveforms for a write operation of the memory in the device.

The signals for the simplest read and write operations for the device are shown in FIGS. 14 and 15. The signals 'READY' and 'CLKIN' are not shown as the memory cycles here apply to any register except the data register. They will apply to the data register only if 'READY' is not used. As with the register map the host interfaces are identical, both electrically and functionally.

The desired register is selected by putting the appropriate code (see FIG. 3) on the register select lines (S0–S2) and by putting chip enable (CE−) low. If a write operation is desired then a negative-going pulse is applied to the write enable pin (WE−) and valid data is set up on the data lines (D0–D7) sooner than the required set-up time before the rising edge of the write enable. If a read operation is desired then the output enable (CE−) signal is set low which brings the data lines out of a high impedance state. The data that they display will only be valid however after the appropriate access time has elapsed from the register being selected.

Although the device host interfaces can function with the 'READY' and 'CLKIN' signals not used, they are both required if concurrent access is desired by both host systems. Under these conditions the selection of one interface or the other on to the RAM is done by the arbitration latch 16. It is the responsibility of the host interface logic to put the host which is unsuccessful in gaining access into a wait state.

When a host system addresses the data register 6 or 7 of the device (chip enable low and the appropriate code on the register select lines), 'READY' is immediately set low regardless of whether or not access is actually gained to the RAM. 'READY' will then stay low and the interface will remain in a wait state until any uncertainty in the arbitration latch has resolved itself and access has been clearly gained.

The majority of systems will not accept an asynchronous 'READY' signal, hence synchronisation for this signal is provided on the device. The falling edge of 'READY' is generated by the CPU addressing its data register so it is already synchronous; the rising edge however is not and must be synchronised to the system clock. The signal 'CLKIN' is provided for this purpose alone.

Figure 6:
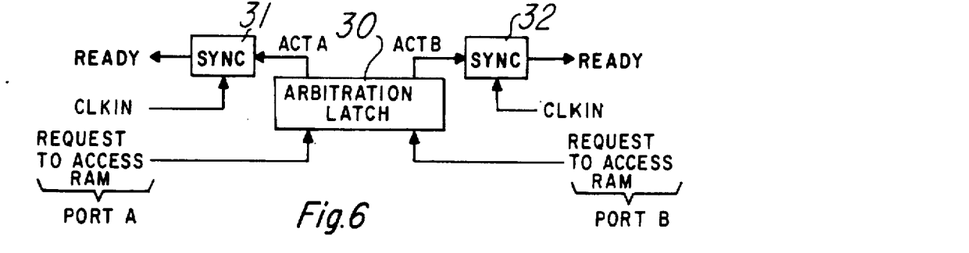
FIG. 6 is a block diagram illustrating the synchronisation of the signals from the arbitration latch.
Figure 7:
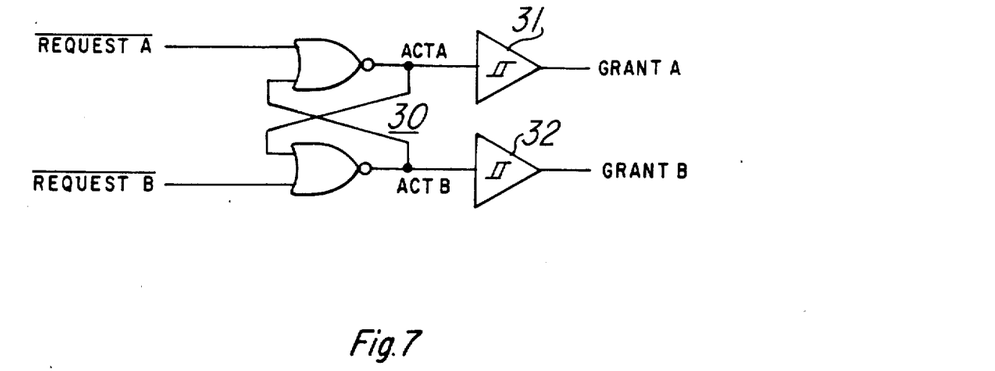
FIG. 7 shows the circuit of one example of the arbitration latch.
Figure 16:
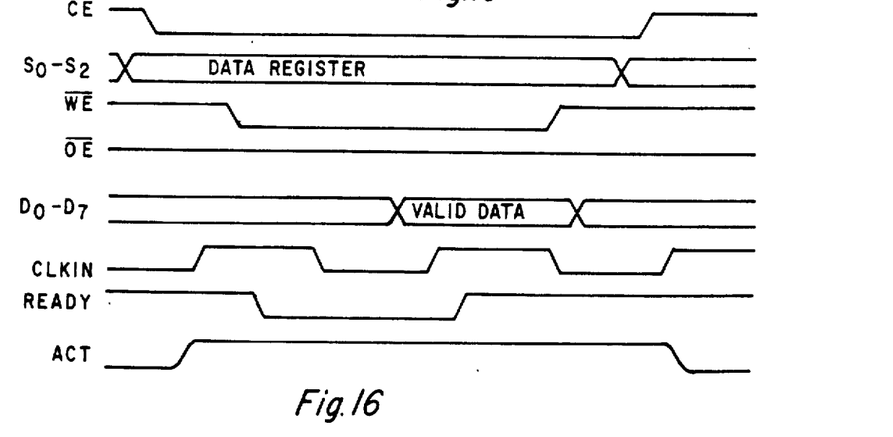
FIG. 16 shows the waveforms for the operation of READY and CLKIN in the device.

A simplified diagram of the arbitration latch 16 is shown in FIG. 7 and has a bistable 30 of which each output ACTA or ACTB is monitored by a threshold detector 31 or 32 which tests for a level in excess of the metastable level. ACTA or ACTB reaching this level indicates any conflict has resolved itself and the corresponding port has gained access to the RAM. As may be seen from FIGS. 6 and 16, during the 'CLKIN' high period the output of the threshold detector is sampled. When 'CLKIN' is low the feedback is applied consolidate the sampled value so that any indeterminate sample will go to a valid '1' or '0' level. If a '1' is detected indicating that the memory cycle can proceed then 'READY' is set high on the next rising edge of 'CLKIN'.

Figure 17:
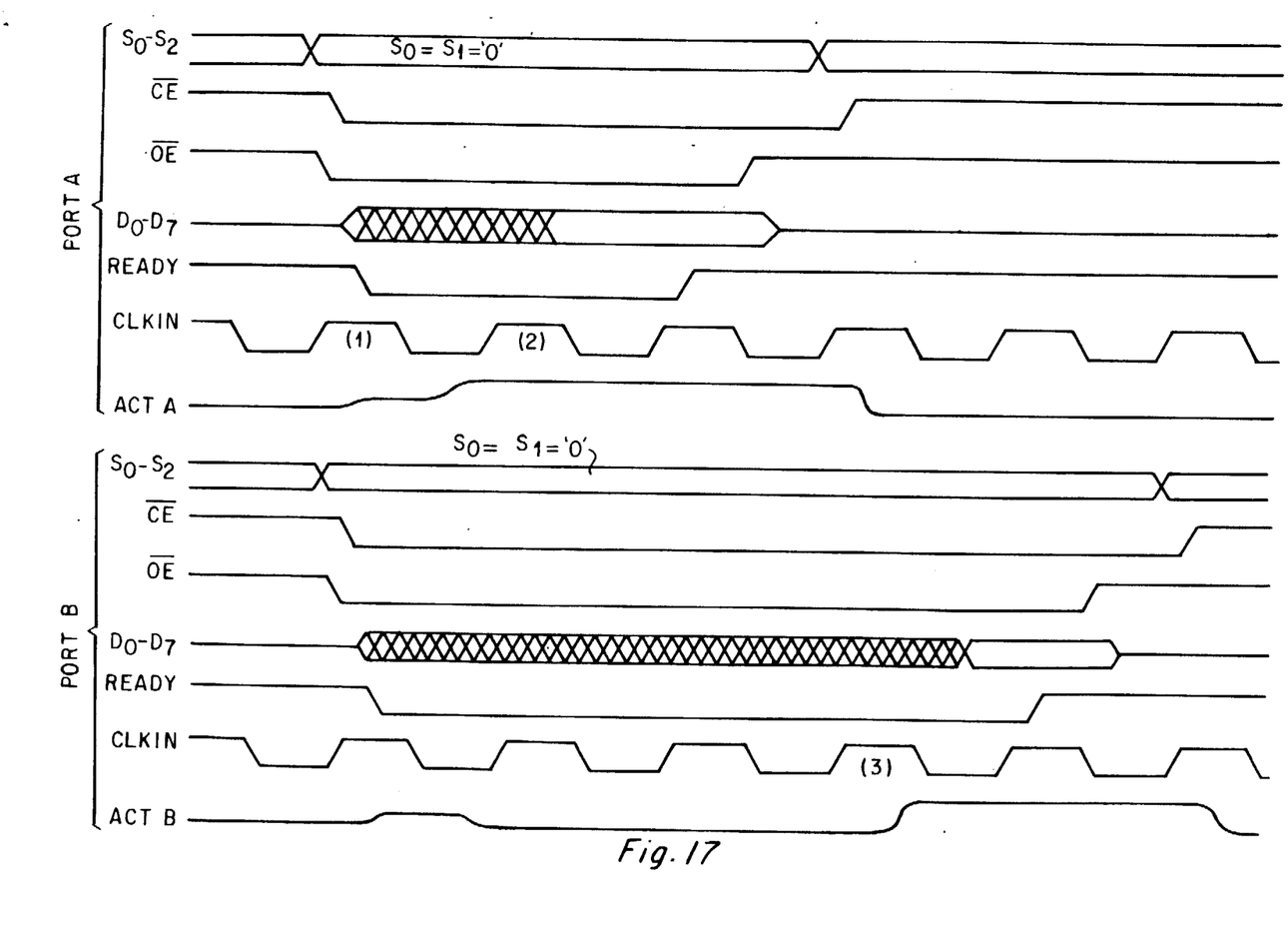
FIG. 17 shows the waveforms which could occur with simultaneous read cycles on both ports of the device.

FIG. 17 shows the waveforms occurring when two read cycles occur concurrently. When the data registers are addressed the ACTA and ACTB bits both begin to rise. As they are both mutually exclusive a metastable condition is reached and it is significantly later that a result is seen from this conflict when, in this case, port A gains access and port B does not. 'READY' is taken low on both ports as soon as the data registers are addressed. At port A during the first subsequent 'CLKIN' high period (1) ACTA is not seen as having a valid high level, therefore it is the value sampled in the second 'CLKIN' high period (2) that results in 'READY' being set high on the next rising edge of 'CLKIN'. Note that, ACTA selects the data and local address pointer registers of port A on to the data and address lines of the RAM. Hence it is not until after ACTA reaches a good '1' level that valid data is seen on the port A data lines. Port A then completes its memory cycle and ceases to address its data register. ACTA therefore goes low again which allows ACTB to rise to a '1' level. This fact is detected in the 'CLKIN' high period of port B (3) and 'READY' goes high on the next rising edge. Up to this point the data lines of port B have been displaying invalid data. This becomes valid after ACTB reaches a good '1' level. The memory cycle at port B can then be completed.

Both ports have a lockout feature which may be asserted by one of two means: firstly by putting a low level on the 'LOCKIN−−' input of the host interface and secondly by writing a '1' to the 'SLOC' bit of the control register. If a lockout is asserted by the local port then the 'ACT' bit of the remote port is held low. This means that if the remote port addresses its data register, it will not get access to the RAM. If 'CLKIN' and 'READY' are used on the remote port then it will enter a wait state until the lockout is removed.

The assertion of a lockout will not guarantee immediate exclusive use of the RAM. A lockout asserted by the local port will only become effective after any memory operation to the RAM by the remote port has been completed. It will also not be effective until any lockout asserted by the remote port has been cleared. Lockouts, therefore, are mutually exclusive in a similar way to ACTA and ACTB, and concurrent lockout requests from both ports are assigned on a first-come, first-served basis.

Figure 18:
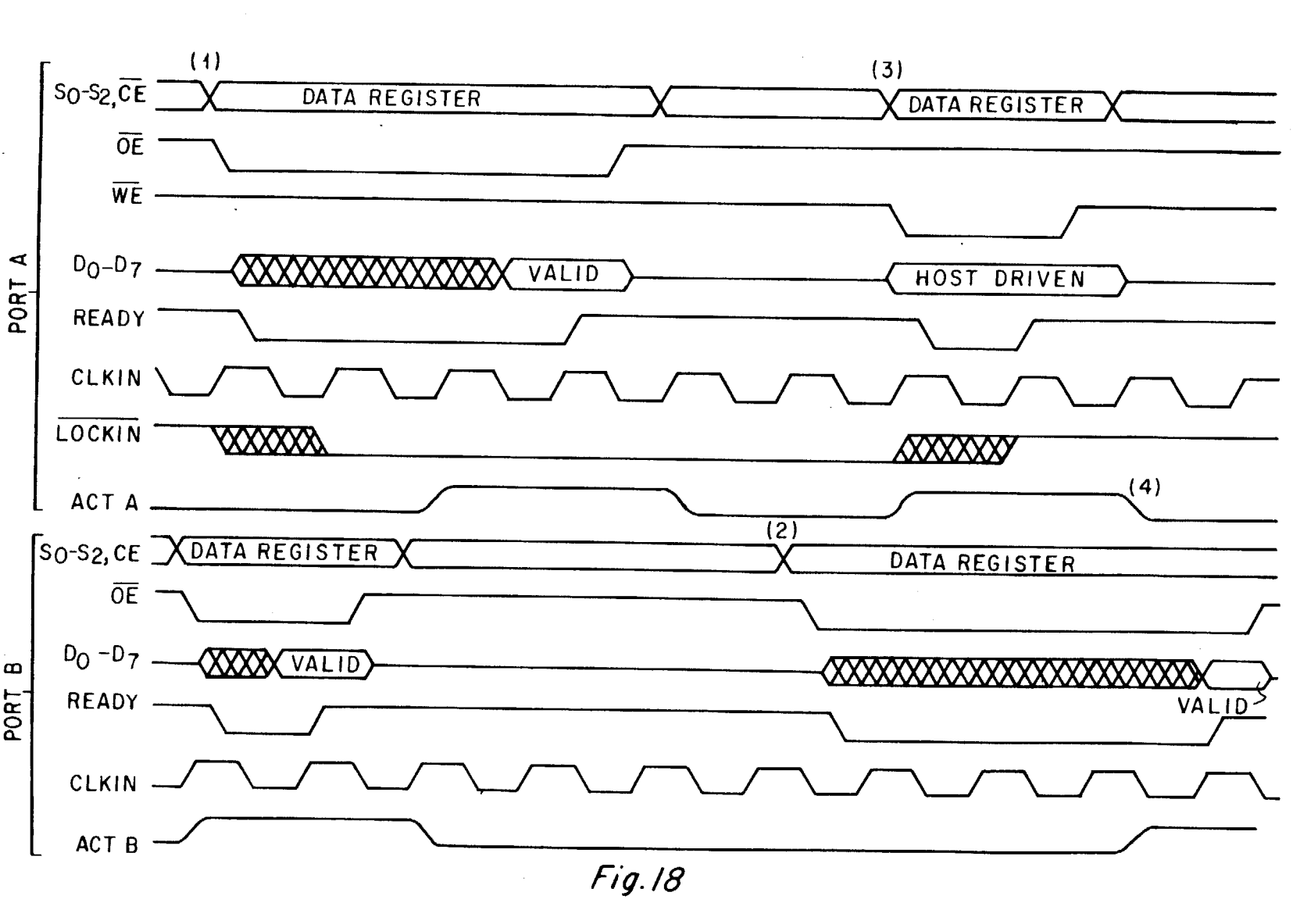
FIG. 18 shows the waveforms for a typical read-modify-write operation in the device using $\overline{\text{LOCKIN}}$.

An example of the lockout facility being used to implement an indivisible READ-MODIFY-WRITE operation is shown in FIG. 18 where port A performs the read and write operations with a lockout asserted between them by means of the 'LOCKIN' input. At the time when port A tries to do a read from the RAM at (1), there is already a read cycle in progress on port B. Port A therefore enters a wait state until this operation is complete even though the 'LOCKIN−' input is asserted. When the read cycle at port B is complete, the memory operation at port A can proceed and, in addition, the lockout of port B become effective. Consequently when the next memory operation is initiated to port B at (2) it enters a wait state even though there is no activity on port A. Port A then enters a write cycle at (3) during which the 'LOCKIN−' is removed. When the write cycle ends and ACTA goes low at (4), ACTB can rise in the absence of the lockout and the memory operation be completed here also. Hence the read and write operations at port A cannot be interfered with from port B. 'LOCKIN' would be derived from a 'MULTI-PROCESSOR INTERLOCK' type signal in host system B.

In a system where the user does not wish to use the 'READY' and 'CLKIN' signals on a particular port, the 'SLOC' bit may be used to guarantee that access will be gained to the RAM. The 'LAK' interrupt status bit will be set in response to 'SLOC' as soon as the lockout becomes effective. This means that 'LAK' will not be set until any current memory cycle to the RAM from the remote port has been cleared. From this time the local port will have exclusive use of the RAM until it clears 'SLOC'.

Figure 10:
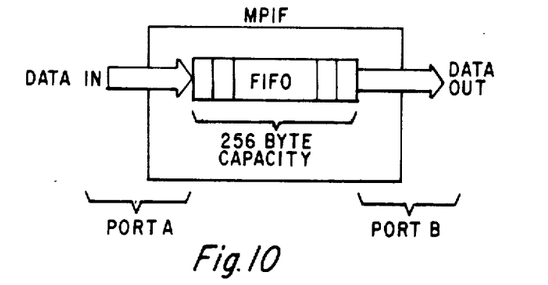
FIG. 10 is a diagram illustrating the use of a device as a FIFO buffer between two systems to transfer more than 256 bytes of data from one system to the other.

If it is desired to move data blocks of greater than 256 bytes between systems then the device may be used to implement a circular buffer to absorb any data transfer rate mis-match between systems. Consider the case of system A (connected to port A) sending a block of data to system B. Both systems implement the device 'READY' signal. FIG. 10 shows the arrangement.

To begin the transfer the address pointer registers 8 and 9 of both ports are set to be the same. This identity is detected by the comparator 17. The setting of the registers may be done by either host system provided that the address pointer of port B is set up last. This will generate an 'RPE' interrupt to system A and a 'LPE' interrupt to system B, these serving as 'BUFFER EMPTY' interrupts. Normally, system B should then avoid reading the RAM until the 'LPE' interrupt has gone; however if the 'LEA' feature is enabled then system B can begin its first read as it will enter a wait state until the first byte is written into the buffer. When system A starts loading data via its DATA/INC register, the equality of pointers is removed and the receiving system can sequentially read the data via its DATA/INC register. If the reading pointer succeeds in catching up with the writing pointer then again system A will receive a 'RPE' and system B an 'LPE' and a lockout (assuming 'LEA' is set) indicating that the buffer is empty.

If the sending system succeeds in getting 256 bytes ahead of the receiving system then again the address pointers become equal. This time system A gets the lockout and an 'LPE' interrupt and system B gets an 'RPE' interrupt. This corresponds to a 'BUFFER FULL' interrupt and the sending system will be prevented from writing more data until there is room for it.

Another possible method of buffering large data streams is as follows: If the sending interface in the above example fills the buffer and receives 'LPE' interrupt then it may subtract a certain number from that in its local address pointer and reload it with the result. It will then be interrupted when there is this certain number of bytes left in the buffer and may return the original value to the address pointer and refill the buffer. The sending system should, however, return the original value to its local address pointer if it enters a condition where it is unable to respond to an interrupt before the remaining bytes in the buffer are read.

An equivalent procedure may be undertaken by the receiving host system. This time a certain number is added to the pointer register and an 'RPE' interrupt received when there is that number of bytes in the The device also has two mode pins 24 connected to the host interfaces 2 and 3.

The mode pins M1, M2, are used to reset the device and to enable several devices to be used in parallel on memory buses of greater than 8 bits. Four modes can be encoded by inputs on these pins: RESET (M1=M2='0'), STANDALONE (M1=M2='1'), MASTER (M1='0', M2='1'), and SLAVE (M1='1', M2='0'). Schmitt triggers are provided in the interfaces on both inputs to permit the use of a resistor and capacitor arrangement to implement reset.

The RESET function establishes the following conditions on-chip:
(1) All bits of the control register are cleared.
(2) The 'MI' interrupt status bit is cleared.
(3) The 'MO' interrupt status bit is set.
(4) The data lines 'D0-D7' of the host interfaces are held in a high impedance state.
(5) The 'READY' output of each port is held in a high impedance state.

The other three combinations of the mode pins are operating modes. FIG. 8 summarises the modes.

The STANDALONE mode is the operating mode of a single device. To implement RESET with this mode of operation, both M1 and M2 should be connected to an active low system 'RESET(BAR)' signal.

Figure 9:
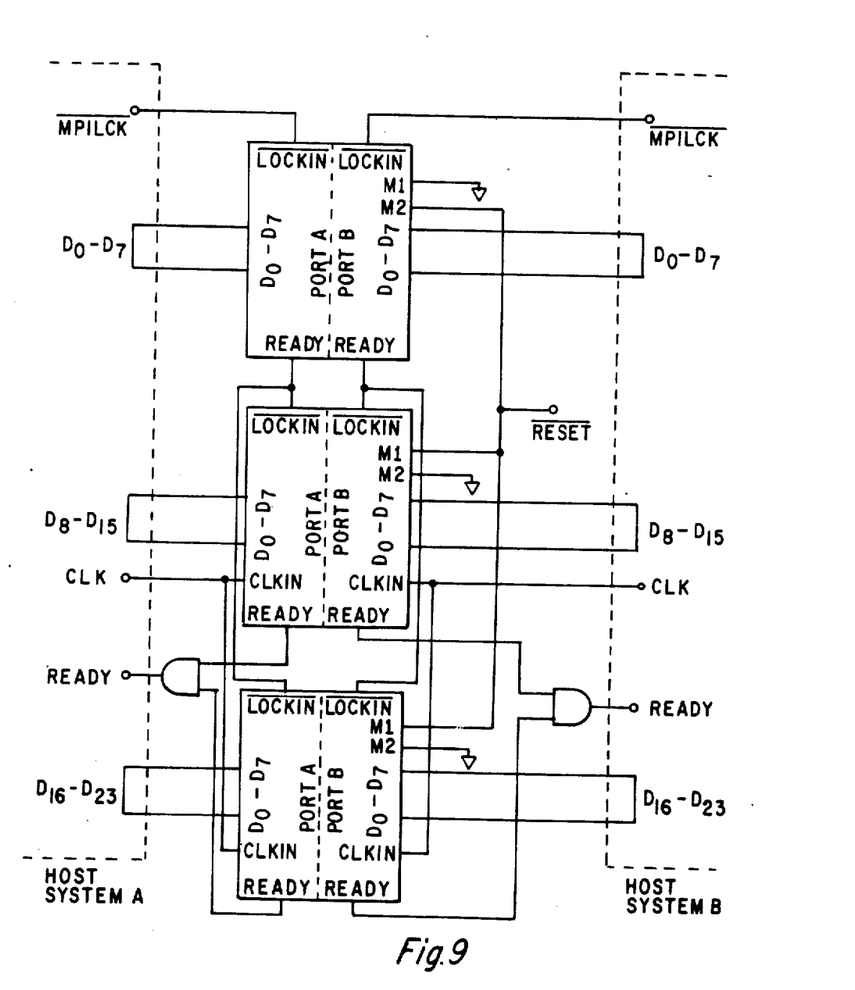
FIG. 9 shows one example of master-slave operation using three devices to interface host systems using 24 bit data busses.

The MASTER and SLAVE modes are included to avoid the possibility of problems occurring in multiple device arrangements. During simultaneous attempts at getting access to the RAM by both ports it is possible for the arbitration latches in different devices to fall in opposite directions with the consequent system malfunction. These modes allow the arbitration latch in only one device to decide which port should have access. This decision is then passed on to the remainder. FIG. 9 shows an example of a system employing three devices in parallel. Note that the READY outputs of the uppermost (the MASTER) device are connected to the $\overline{\text{LOCKIN}}$ inputs of the other (the SLAVE) devices and that the READY outputs of the slave devices are ANDed together to produce 'READY' signal for the host systems. In addition, the CLKIN inputs of the SLAVE devices receive the CLK outputs of the host systems. The circuit techniques shown can be used for any plurality of devices in parallel.

To implement the RESET function on the master device: M2 should be connected to the system 'RESET(BAR)' signal and M1 should be grounded. In normal operation the timing of the 'READY' line of each port is changed to provide an unclocked, active high indication of when that port has gained access to the RAM. A 'CLKIN' input is therefore not required by the master device.

On the slave devices, M1 is connected to the system 'RESET(BAR)' line and M2 is grounded. In this mode the 'LOCKIN' signals of each port become enable inputs which are connected directly to the modified 'READY' outputs of the corresponding port of the master device. The slave has no arbitration and responds to a high level on the 'READY' output of the master by granting access to the appropriate port immediately. At this time it also begins the procedure of releasing its own 'READY' line which is synchronised in the same way as on the standalone device. Hence a 'CLKIN' must be supplied to the slave devices. In dual device arrangements, the 'READY' outputs of the slave may be taken directly to the 'READY' input of the host systems, with more than one slave the 'READY' outputs of each port should be ANDed together to ensure that all devices have access to the port before 'READY' is released.

Using one or more devices according to the invention, the design of a dedicated multiprocessor system is straightforward. The designer first determines all the functions to be performed by the system, and then partitions these functions among as many processors, e.g. microprocessors, as are required to achieve the desired level of performance. Each pair of processors with closely-linked functions requires a direct communication path between them which is provided on interface. This can be illustrated with a brief example.

Figure 11:
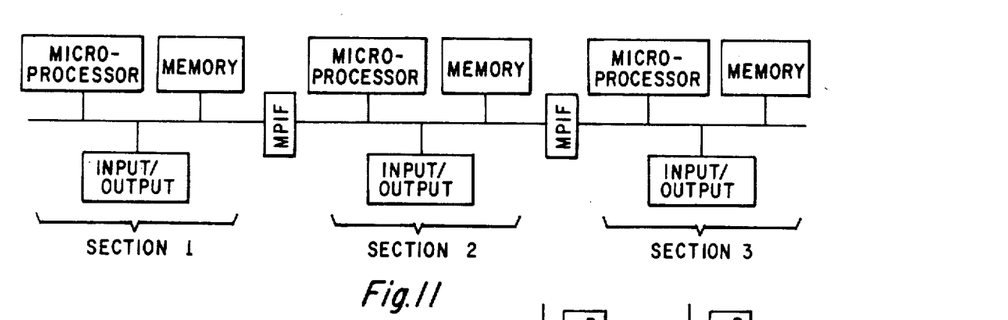
FIG. 11 is a block diagram showing the use of two devices to interface between three processors.

A block diagram of a system containing three processors and two interface devices appears in FIG. 11. The flow of data between sections 1 and 2 and sections 2 and 3 is sufficiently high to warrant linking them together with interfaces. Assuming little or no data exchange occurs directly between sections 1 and 3, no third interface is needed. The multiprocessor system shown in FIG. 11 might be a controller board for an intelligent terminal, for example. Section 1 could be the communications front-end processor, section 2 could be the keyboard monitor and high-level user interface, and section 3 could be the CRT controller and graphics processor.

The system of FIG. 11 cannot easily be configured to meet changing application requirements without altering the printed circuit board. In those instances when all system needs cannot be anticipated at the time the hardware is designed, a more modular approach is needed to permit the system to be configured to meet changing application needs. Some specific instances of a more modular, bus-oriented approach are shown in FIGS. 12 and 13.

Figure 12:
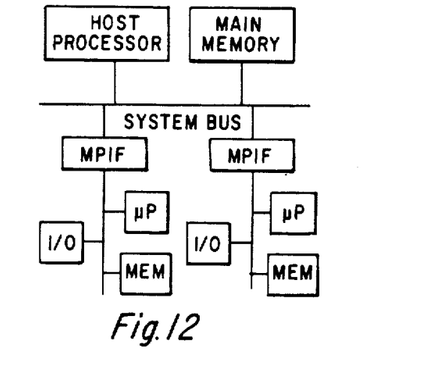
FIG. 12 shows the use of devices to interface intelligent function units to the system bus of a host processor.

In FIG. 12, a system bus is controlled by a host processor. Also connected to this bus are a main memory and two intelligent function modules. Each function module contains an interface device, a processor, memory and I/O capability. These and other similar modules are easily connected to or removed from the host system bus to configure the system as required. The host presents a "master" interface capable of actively initiating bus transfers. The other module—memory and interface devices—present passive or "slave" interfaces to the bus. They can transmit or receive data only under the direct influence of the master interface. Whereas a master interface tends to be relatively complex to provide these capabilities, the interface devices can operate with the bus as easily as a memory or any other device with a slave interface.

A DMA (direct memory access) controller can be added to the system bus in FIG. 12 (not shown) to assist the host in transferring blocks of data between the main memory and the function modules. Each word transferred via DMA consumes two bus cycles. For example, in moving data from a function module to the main memory, the DMA controller first reads each word from the module, and then it writes the word to memory.

Figure 13:
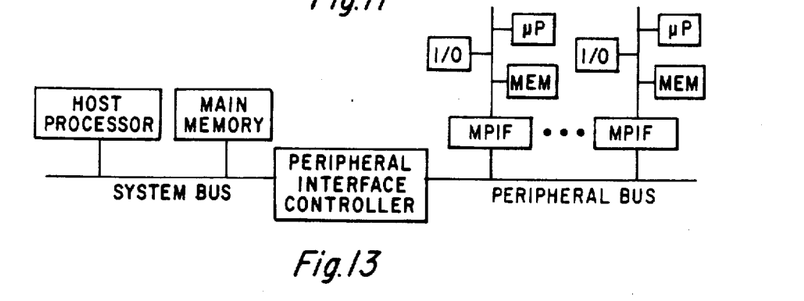
FIG. 13 shows the use of devices to interface intelligent function units to a peripheral bus of a host processor system.

FIG. 13 presents a variation on the system of FIG. 12. Here the function modules are connected to a special peripheral bus separate from the system bus on which the host processor resides. A peripheral interface controller (PIC) serves to isolate the peripheral bus from the system bus. Assuming the PIC has DMA capability on both buses, each word transferred between a function module and the main memory requires one peripheral bus cycle and one system bus cycle. This decreases the traffic over the system bus to half of that required for the previous example. The peripheral bus can be especially designed to minimize the amount of logic required to interface to the function modules. Whereas a processor module residing on the system bus may require a complex interface supporting a large address space and arbitration among multiple bus masters, the peripheral bus can be much simpler. The peripheral bus need support only a single master (the PIC) and only enough address space to contain the register maps of a handful of function modules.

If several master processors share a system bus as in FIG. 12 without the host processor; each processor module may be modified to present both a master bus interface (BIF) and a slave bus interface (the MPIF) to the system bus. The processors communicate by exchanging messages, rather than have the sending processor write the message to common memory, and then have the receiving processor read it from common memory, the sending processor can write its message directly to the MPIF of the receiving processor. This cuts the message traffic over the bus in half.

In one embodiment, a multiprocessor interface device is constructed as an integrated circuit using n-channel silicon-gate technology requiring a single 5 volt supply and mounted in a 40-pin d.i.l. package. In addition to the pins indicated in FIG. 2 the power supply $V_{cc}$ and ground reference $V_{ss}$ pins complete the 40.

Although the invention has been described with reference to a specific embodiment, it is not limited to the details of this embodiment as described. For example, other forms of arbitration latch may be employed, different sizes of random access memory may be provided, or more or fewer control signals may be used to suit the kinds of processors to be interfaced.

What is claimed is:

1. A multiprocessor interface device comprising:
   a random access memory;
   first and second processor interfaces, each having a port for connection to a corresponding processor, each of said processor interfaces comprising
      a bidirectional address/data bus for bidirectionally connecting address or data information between said corresponding processor and said multiprocessor interface device,
      a processor control bus for receiving control signals from said corresponding processor, said received control signals including at least an access request control signal;
      an interface control bus for transmitting control signals to said corresponding processor, said transmitted control signals including at least a ready control signal having a first logic state indicating that access to said random access memory is granted, and having a second logic state indicating that access to said random access memory is not granted; and
      an address pointer register, connected to said bidirectional address/data bus, connected to said random access memory, and addressable by said corresponding processor, for storing address information;
   an arbitration latch connected to said random access memory, said first processor interface and said second processor interface for
      connecting only one of said first and second processor interfaces to said random access memory,
      causing said one processor interface to transmit its ready control signal at said first logic state to the corresponding processor indicating access is granted, and
      causing the other processor interface to transmit its ready control signal at said second logic state to the corresponding processor indicating access is not granted, said arbitration latch controlled by said access request signals to grant access to said first and second processor interfaces on a first-come first-served basis; and
   an address equal detector, connected to said address pointer registers of said first processor interface and to said address pointer register of said second processor interface, for generating an address register equal signal when the contents of said address pointer register of said first processor interface and the contents of said address pointer register of said second processor interface are equal.

2. A multiprocessor interface device as claimed in claim 1, wherein said arbitration latch comprises:
   a bistable latch circuit having two inputs receiving the access request control signals of corresponding processor interfaces and two outputs generating signals of opposite polarity, and a pair of threshold circuits connected to respective outputs of said bistable latch circuit, each threshold circuit generating one of said ready control signals, each threshold circuit generating a ready signal at said first logic state indicating access granted only if the corresponding output of said bistable latch circuit exceeds a threshold signal level greater than any signal generated by said corresponding output when said bistable latch circuit is in a metastable condition, whereby both said first and second processor interfaces generate ready signals at said second logic state indicating access is not granted if said bistable latch is in a metastable condition.

3. A multiprocessor interface device as claimed in claim 1, wherein:

each of said processor interfaces further comprises a data read/write controller connected to said processor control bus, and said random access memory for reading the data stored in said random access memory at the address specified by the address information stored in said address pointer register and applying said data to said bidirectional address-/data bus in response to a read data control signal on said processor control bus when said arbitration latch connects said processor interface to said random access memory, and writing the data received on said bidirectional address/data bus into said random access memory at the address specified by the address information stored in said address register in response to a write data control signal on said processor control bus when said arbitration latch connects said processor interface to said random access memory; and wherein said arbitration latch further comprises a data multiplexer connected to said first and second processor interfaces for connecting said random access memory to the address/data bus of said one of said processor interfaces granted access to said random access memory, and an address multiplexer connected to said address pointer register of said first and second processor interfaces for connecting said random access memory to said address pointer register of said one of said processor interfaces granted access to said random access memory.

4. A multiprocessor interface device as claimed in claim 3, wherein:

each processor interface further comprises a data register connected to said bidirectional address-/data bus and said data multiplexer for storage of data information received from said bidirectional address/data bus or from said random access memory.

5. A multiprocessor interface device as claimed in claim 3, wherein:

each processor interface further comprises an incrementing data read/write controller connected to said processor control bus, said address pointer register and said random access memory for reading the data stored in said random access memory at the address specified by the address information stored in said address pointer register and applying said data to said bidirectional address-/data bus and incrementing said address pointer register to the next sequential address in response to a read data/increment control signal on said processor control bus when said arbitration register connects said processor interface to said random access memory, and writing the data received on said bidirectional address/data bus into said random access memory at the address specified by the address information stored in said address pointer register and incrementing said address pointer register to the next sequential address in response to a write data/increment control signal on said processor control bus when said arbitration latch connects said processor interface to said random access memory.

6. A multiprocessor interface device as claimed in claim 3, wherein:

each processor interface further comprises an address read/write controller connected to said processor control bus and said address pointer register for writing the address information received on said bidirectional address/data bus into said corresponding address pointer register in response to a address write control signal on said processor control bus when said arbitration latch connects said processor interface to said random access memory, and reading the address information stored in said address pointer register and applying said address information to said bidirectional address/data bus in response to a address read control signal on said processor control bus when said arbitration latch connects said processor interface to said random access memory.

7. A multiprocessor interface device as claimed in claim 3, wherein:

each processor interface further comprises an address read/write controller connected to said processor control bus and said address pointer register for writing the address information received on said bidirectional address/data bus into said corresponding address pointer register in response to a local address write control signal on said processor control bus when said arbitration latch connects said processor interface to said random access memory, reading the address information stored in said address pointer register and applying said address information to said bidirectional address/data bus in response to a local address read control signal on said processor control bus when said arbitration latch connects said processor interface to said random access memory, writing the address information received on said bidirectional address/data bus into said corresponding address pointer register in response to a remote address write control signal on said processor control bus when said arbitration latch connects said processor interface to said random access memory, and reading the address information stored in said address pointer register and applying said address information to said bidirectional address/data bus in response to a remote address read control signal on said processor control bus when said arbitration latch connects said processor interface to said random access memory.

8. A multiprocessor interface device as claimed in claim 1, wherein:
said address equal detector generates for each processor interface:
a local address register equal signal when the contents of said address pointer register of said processor interface is changed to equal the contents of said address pointer register of said other processor interface, and
a remote address register equal signal when the contents of said address pointer register of said other processor interface is changed to equal the contents of said address pointer register of said processor interface.

9. A multiprocessor interface device comprising:
a random access memory;
first and second processor interfaces, each having a port for connection to a corresponding processor, each of said processor interfaces comprising:
a bidirectional address/data bus for bidirectionally connecting address or data information between said corresponding processor and said multiprocessor interface device,
a processor control bus for receiving control signals from said corresponding processor, said received control signals including at least an access request control signal;
an interface control bus for transmitting control signals to said corresponding processor, said transmitted control signals including at least a ready control signal having a first logic state indicating the access to said random access memory is granted, and having a second logic state indicating that access to said random access memory is not granted;
an address pointer register, connected to said bidirectional address/data bus, connected to said random access memory, and addressable by said corresponding processor, for storing address information;
a message register connected to said bidirectional address/data bus for storage of address information received from said bidirectional address/data bus, and
a message register read/write controller connected to said processor control bus and said message register for
writing the data received on said bidirectional address/data bus into said message register in response to a write message control signal on said processor control bus, and
reading the data stored in said message register and applying said data to said bidirectional address/data bus in respons to a read message control signal on said processor control bus; and
an arbitration latch connected to said random access memory, said first processor interface and said second processor interface for
connecting only one of said first and second processor interfaces to said random access memory,
causing said one processor interface to transmit its ready control signal at said first logic state to the corresponding processor indicating access is granted, and
causing the other processor interface to transmit its ready control signal at said second logic state to the corresponding processor indicating access is not granted, said arbitration latch controlled by said access request signals to grant access to said first and second processor interfaces on a first-come first-served basis.

10. A multiprocessor interface device as claimed in claim 9, wherein:
each of said processor interfaces further includes a remote message register read controller connected to said processor control bus and said message register of said other processor interface for reading the data stored in said message register of said other processor interface and applying said data to said bidirectional address/data bus in response to a read remote message control signal on said processor control bus.

11. A multiprocessor interface device as claimed in claim 10, wherein:
each processor interface further includes
an message in detector connected to said message register read/write controller of said processor interface and said message register read/write controller of other processor interface for
generating a message in signal when said other processor interface writes into said message register of said other processor interface, and
clearing said message in signal when said processor interface reads said message register of said other processor interface.

12. A multiprocessor interface device as claimed in claim 10, wherein:
each processor interface further includes
an message out detector connected to said message register read/write controller of said processor interface and said message register read/write controller of other processor interface for
generating a message out available signal when said other processor interface reads said message register of said processor interface, and
clearing said message out available signal when said processor interface writes into said message register.

13. A multiprocessor interface system comprising:
a master multiprocessor interface device embodied in a single semiconductor substrate including
a master random access memory,
a first and second master processor interfaces, each having a port for connection to a corresponding first or second processor each of said ports including
a master bidirectional address/data bus for bidirectionally coupling address or data information between said multiprocessor interface device and a subset of the address and data lines of said port's corresponding processor, and
a control bus for transmitting access request control signals from said port's corresponding processor to said processor interface; and
a master arbitration latch connected to said random access memory, said first processor interface and said second processor interface for connecting only one of said first and second processor interfaces to said random access memory, said arbitration latch controlled by said access request control signals to grant access to said first and second processor interfaces on a first-come first-served basis; and at least one slave multiprocessor interface device embodied in a single semiconductor substrate including a slave random access memory, first and second slave processor interfaces, each having a port for connection to a corresponding first or second processor, each of said ports including a slave bidirectional address/data bus for bidirectionally coupling address or data information between said multiprocessor interface device and a subset of the address and data lines of said corresponding processor, and a slave arbitration latch connected to said random access memory, said first processor interface, said second processor interface, and said master arbitration latch for connecting only one of said first and second processor interfaces to said random access memory, said slave arbitration latch controlled by the state of said master arbitration latch.

* * * * *